(12) United States Patent
Kim et al.

(10) Patent No.: US 10,906,530 B2
(45) Date of Patent: Feb. 2, 2021

(54) AUTOMATIC PARKING SYSTEM AND AUTOMATIC PARKING METHOD

(71) Applicants: HYUNDAI MOTOR COMPANY, Seoul (KR); KIA MOTORS CORPORATION, Seoul (KR)

(72) Inventors: Yoon Soo Kim, Suwon-si (KR); Dae Joong Yoon, Hwaseong-si (KR); Eu Gene Chang, Gunpo-si (KR); Jae Seob Choi, Suwon-si (KR); Min Byeong Lee, Seongnam-si (KR); Seung Wook Park, Yongin-si (KR); Jong Gyu Kim, Incheon (KR); In Yong Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 389 days.

(21) Appl. No.: 15/833,765

(22) Filed: Dec. 6, 2017

(65) Prior Publication Data

US 2018/0105167 A1 Apr. 19, 2018

Related U.S. Application Data

(63) Continuation-in-part of application No. 15/014,646, filed on Feb. 3, 2016, now Pat. No. 10,384,719.

(30) Foreign Application Priority Data

Nov. 10, 2015 (KR) .................. 10-2015-0157406
Dec. 30, 2016 (KR) .................. 10-2016-0184291

(51) Int. Cl.
*B60W 30/06* (2006.01)
*G05D 1/00* (2006.01)
(Continued)

(52) U.S. Cl.
CPC .......... *B60W 30/06* (2013.01); *B60W 50/085* (2013.01); *B60W 50/14* (2013.01);
(Continued)

(58) Field of Classification Search
CPC .... B60W 30/06; B60W 50/085; B60W 50/14; B60W 2556/50; B60W 2554/00;
(Continued)

(56) References Cited

U.S. PATENT DOCUMENTS 6,571,193 B1 5/2003 Unuma et al.
7,202,775 B2 4/2007 Yezersky et al.
(Continued)

FOREIGN PATENT DOCUMENTS

DE 102012007986 A1 10/2013
JP 2006-044484 A 2/2006
(Continued)

OTHER PUBLICATIONS

U.S. Office Action dated Sep. 8, 2017 issued in U.S. Appl. No. 15/014,646.
(Continued)

*Primary Examiner* — Angelina Shudy
(74) *Attorney, Agent, or Firm* — Morgan, Lewis & Bockius LLP

(57) ABSTRACT

An automatic parking system includes a smart key recognizing sensor recognizing a smart key positioned in a first area, a sensor system sensing presence or absence of a parking section line, and positions of surrounding vehicles when the smart key is recognized, a controller configured to analyze data sensed by the sensor system to calculate parking areas around a subject vehicle, calculate a range allowing generation of a moving path based on the parking areas, determine at least two parking types available at a current position of the subject vehicle in the range allowing
(Continued)

generation of a moving path, provide a moving path range for a parking type that is selected among the moving path ranges, and receive a signal transmitted by the smart key to automatically park the subject vehicle in the optimal parking area.

20 Claims, 13 Drawing Sheets

(51) Int. Cl.
    *G06K 9/00*         (2006.01)
    *B60W 50/14*       (2020.01)
    *B60W 50/08*       (2020.01)
    *G05D 1/02*         (2020.01)
    *B62D 15/02*       (2006.01)

(52) U.S. Cl.
    CPC ....... B62D 15/0285 (2013.01); G05D 1/0016 (2013.01); G05D 1/0044 (2013.01); G05D 1/021 (2013.01); G06K 9/00812 (2013.01); *B60W 2050/146* (2013.01); *B60W 2420/42* (2013.01); *B60W 2420/52* (2013.01); *B60W 2554/00* (2020.02); *B60W 2554/80* (2020.02); *B60W 2556/50* (2020.02); *B60W 2710/1005* (2013.01); *B60W 2710/186* (2013.01); *B60W 2710/20* (2013.01)

(58) Field of Classification Search
    CPC ....... B60W 2554/80; B60W 2050/146; B60W 2420/42; B60W 2420/52; B60W 2710/1005; B60W 2710/186; B60W 2710/20; B62D 15/0285; G05D 1/0016; G05D 1/0044; G05D 1/021; G06K 9/00812
    USPC ............................................................ 701/2
    See application file for complete search history.

(56) References Cited

U.S. PATENT DOCUMENTS

| | | | |
|---|---|---|---|
| 7,551,980 B2 | 6/2009 | Sakagami et al. | |
| 7,643,913 B2 | 1/2010 | Taki et al. | |
| 7,737,866 B2 * | 6/2010 | Wu | B62D 15/0285 340/932.2 |
| 8,218,816 B2 | 7/2012 | Sonoura | |
| 8,392,065 B2 | 3/2013 | Tolstedt et al. | |
| 9,073,484 B2 | 7/2015 | Aimura et al. | |
| 9,451,447 B2 | 9/2016 | Tibbitts et al. | |
| 9,696,813 B2 | 7/2017 | Chiu | |
| 9,731,714 B2 | 8/2017 | Kiriya | |
| 9,772,193 B1 | 9/2017 | Mendelson | |
| 9,789,904 B2 | 10/2017 | Jecker et al. | |
| 10,106,153 B1 * | 10/2018 | Xiao | B60W 30/06 |
| 10,431,086 B2 * | 10/2019 | Lee | G08G 1/096775 |
| 10,450,004 B2 * | 10/2019 | Kamiyama | B62D 15/021 |
| 10,606,257 B2 * | 3/2020 | Kim | B60W 30/06 |
| 10,850,680 B2 * | 12/2020 | Han | G06K 9/00798 |
| 2006/0190147 A1 * | 8/2006 | Lee | B62D 15/0275 701/26 |
| 2006/0192650 A1 | 8/2006 | Shinada | |
| 2008/0266137 A1 * | 10/2008 | Son | B62D 15/0275 340/932.2 |
| 2009/0243889 A1 * | 10/2009 | Suhr | G06K 9/00812 340/932.2 |
| 2009/0278709 A1 * | 11/2009 | Endo | B62D 15/027 340/932.2 |
| 2010/0019934 A1 * | 1/2010 | Takano | B62D 15/028 340/932.2 |
| 2010/0063663 A1 | 3/2010 | Tolstedt et al. | |
| 2010/0063680 A1 | 3/2010 | Tolstedt et al. | |
| 2010/0070139 A1 * | 3/2010 | Ohshima | B60R 1/00 701/42 |
| 2010/0089677 A1 * | 4/2010 | Tanaka | B62D 15/0285 180/204 |
| 2010/0219010 A1 * | 9/2010 | Kadowaki | B62D 15/0285 180/204 |
| 2010/0250022 A1 | 9/2010 | Hines et al. | |
| 2010/0274474 A1 * | 10/2010 | Takano | B62D 15/0275 701/532 |
| 2010/0283653 A1 | 11/2010 | Dai et al. | |
| 2011/0026770 A1 | 2/2011 | Brookshire | |
| 2011/0170748 A1 | 7/2011 | Aimura et al. | |
| 2011/0298639 A1 * | 12/2011 | Kadowaki | B62D 15/027 340/932.2 |
| 2012/0314056 A1 * | 12/2012 | Michiguchi | B62D 15/028 348/118 |
| 2012/0316704 A1 | 12/2012 | Ohbayashi et al. | |
| 2012/0320206 A1 | 12/2012 | Sim et al. | |
| 2013/0050490 A1 * | 2/2013 | Kato | G06T 3/0062 348/148 |
| 2013/0099892 A1 | 4/2013 | Tucker et al. | |
| 2013/0120161 A1 * | 5/2013 | Wakabayashi | B62D 15/028 340/932.2 |
| 2013/0120578 A1 * | 5/2013 | Iga | B62D 15/0295 348/148 |
| 2013/0151036 A1 | 6/2013 | Harumoto et al. | |
| 2013/0265428 A1 | 10/2013 | Yoon et al. | |
| 2013/0268144 A1 | 10/2013 | Du et al. | |
| 2013/0316704 A1 | 11/2013 | Home | |
| 2014/0052336 A1 * | 2/2014 | Moshchuk | B62D 15/0285 701/41 |
| 2014/0058613 A1 | 2/2014 | Leinfelder | |
| 2014/0085472 A1 * | 3/2014 | Lu | B60R 1/002 348/148 |
| 2014/0139677 A1 * | 5/2014 | Lambert | H04N 7/183 348/148 |
| 2014/0148971 A1 * | 5/2014 | Sobue | B62D 15/0275 701/1 |
| 2014/0152774 A1 * | 6/2014 | Wakabayashi | G06T 3/005 348/46 |
| 2014/0163862 A1 | 6/2014 | Choi et al. | |
| 2014/0180523 A1 | 6/2014 | Reichel et al. | |
| 2014/0327774 A1 | 11/2014 | Lu et al. | |
| 2014/0348380 A1 | 11/2014 | Yoon et al. | |
| 2014/0365032 A1 | 12/2014 | Park et al. | |
| 2015/0025708 A1 | 1/2015 | Anderson | |
| 2015/0057920 A1 * | 2/2015 | Von Zitzewitz | G08G 1/168 701/409 |
| 2015/0088360 A1 | 3/2015 | Bonnet et al. | |
| 2015/0127208 A1 | 5/2015 | Jecker et al. | |
| 2015/0127217 A1 | 5/2015 | Lee | |
| 2015/0258989 A1 * | 9/2015 | Okano | B62D 15/028 701/1 |
| 2015/0279131 A1 | 10/2015 | Nespolo | |
| 2015/0302261 A1 * | 10/2015 | Kiyohara | B60R 1/00 382/104 |
| 2015/0332532 A1 | 11/2015 | Lee et al. | |
| 2015/0367846 A1 | 12/2015 | Sans | |
| 2015/0375741 A1 | 12/2015 | Kiriya | |
| 2016/0018822 A1 | 1/2016 | Nevdahs et al. | |
| 2016/0114798 A1 | 4/2016 | Kim et al. | |
| 2016/0121849 A1 | 5/2016 | Kim | |
| 2016/0188977 A1 | 6/2016 | Kearns et al. | |
| 2016/0251891 A1 | 9/2016 | Herthan et al. | |
| 2016/0284217 A1 * | 9/2016 | Lee | B62D 15/0285 |
| 2016/0304087 A1 | 10/2016 | Noh | |
| 2016/0304198 A1 | 10/2016 | Jourdan | |
| 2016/0327950 A1 | 11/2016 | Bachrach et al. | |
| 2017/0019480 A1 | 1/2017 | Yokota et al. | |
| 2017/0036695 A1 * | 2/2017 | Lee | B62D 15/027 |
| 2017/0061813 A1 | 3/2017 | Tao et al. | |
| 2017/0309183 A1 | 10/2017 | Nordbruch et al. | |
| 2017/0329329 A1 | 11/2017 | Kamhi et al. | |
| 2017/0342750 A1 | 11/2017 | Hiramine | |
| 2018/0022329 A1 | 1/2018 | Sannodo | |
| 2018/0029591 A1 | 2/2018 | Lavoie | |
| 2018/0037262 A1 | 2/2018 | Imai | |
| 2018/0039264 A1 | 2/2018 | Messner et al. | |

(56) References Cited

U.S. PATENT DOCUMENTS

| | | | |
|---|---|---|---|
| 2018/0082588 A1 | 3/2018 | Hoffman, Jr. et al. | |
| 2018/0093619 A1* | 4/2018 | Han | G02B 27/01 |
| 2018/0105167 A1 | 4/2018 | Kim et al. | |
| 2018/0107207 A1 | 4/2018 | Kim et al. | |
| 2018/0144622 A1 | 5/2018 | Gage et al. | |
| 2018/0312169 A1* | 11/2018 | Harai | B60W 40/10 |

FOREIGN PATENT DOCUMENTS

| | | |
|---|---|---|
| JP | 2008-174192 A | 7/2008 |
| JP | 2010-095027 A | 4/2010 |
| JP | 2012-216079 A | 11/2012 |
| JP | 2013-123096 A | 6/2013 |
| JP | 2013-241088 A | 12/2013 |
| JP | 2015-001778 A | 1/2015 |
| JP | 2015-035181 A | 2/2015 |
| JP | 2015-111386 A | 6/2015 |
| KR | 10-2013-0085235 A | 7/2013 |
| KR | 10-2014-0028724 A | 3/2014 |
| KR | 10-2014-0075505 A | 6/2014 |
| KR | 10-1426468 B1 | 8/2014 |
| KR | 10-1432320 B1 | 8/2014 |
| KR | 2014-0142993 A | 12/2014 |
| KR | 10-2015-0006270 A | 1/2015 |
| KR | 10-2016-0123119 A | 10/2016 |
| WO | 2012161630 A1 | 11/2012 |

OTHER PUBLICATIONS

U.S. Non-Final Office Action dated Sep. 11, 2018 issued in U.S. Appl. No. 15/014,646.
Korean Office Action dated Feb. 8, 2018 issued in Korean Patent Application No. 10-2016-0184291 (with English translation).
Extended Search Report issued in related European application No. 17205261.5, dated May 29, 2018.
U.S. Final Office Action dated Apr. 6, 2018 issued in U.S. Appl. No. 15/014,646.
Extended European Search Report dated May 28, 2018 issued in European Patent Application No. 17205423.1.

* cited by examiner

[Fig. 1]
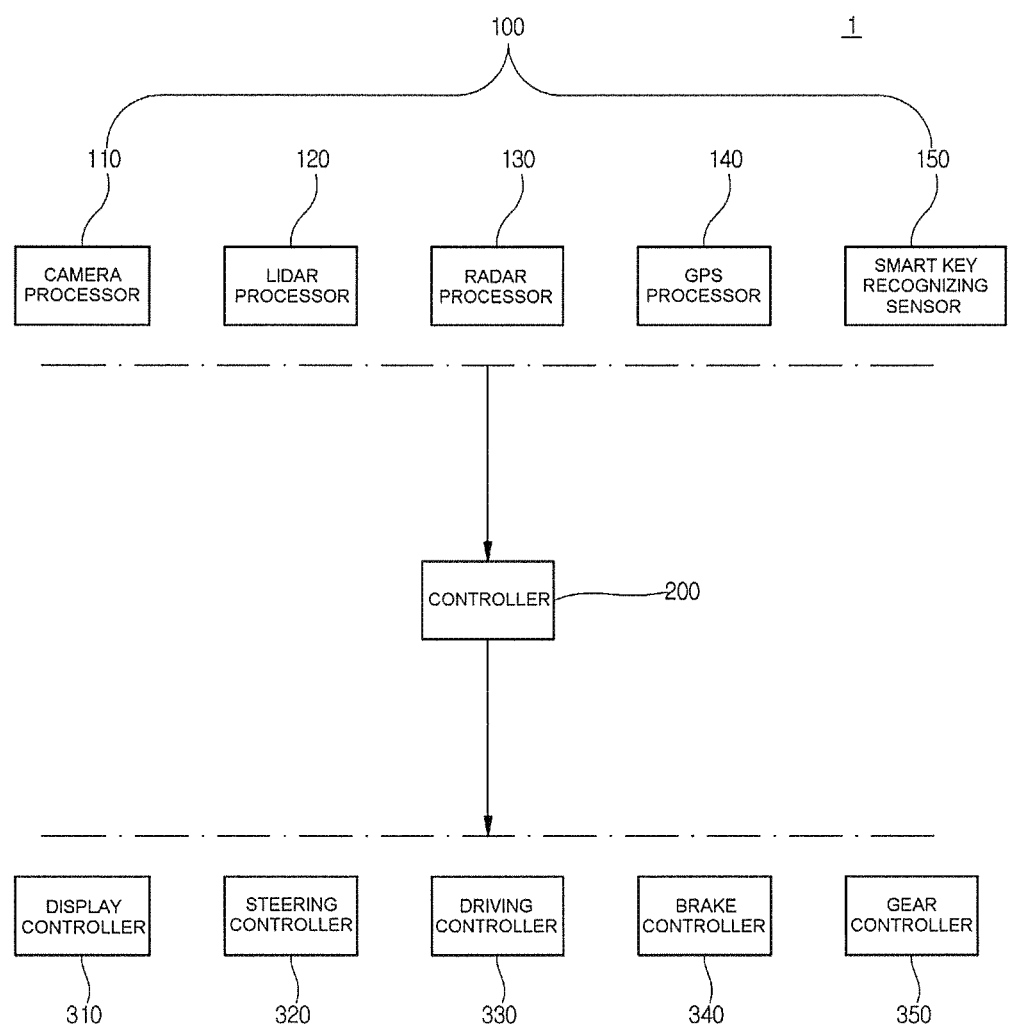

[Fig. 2]
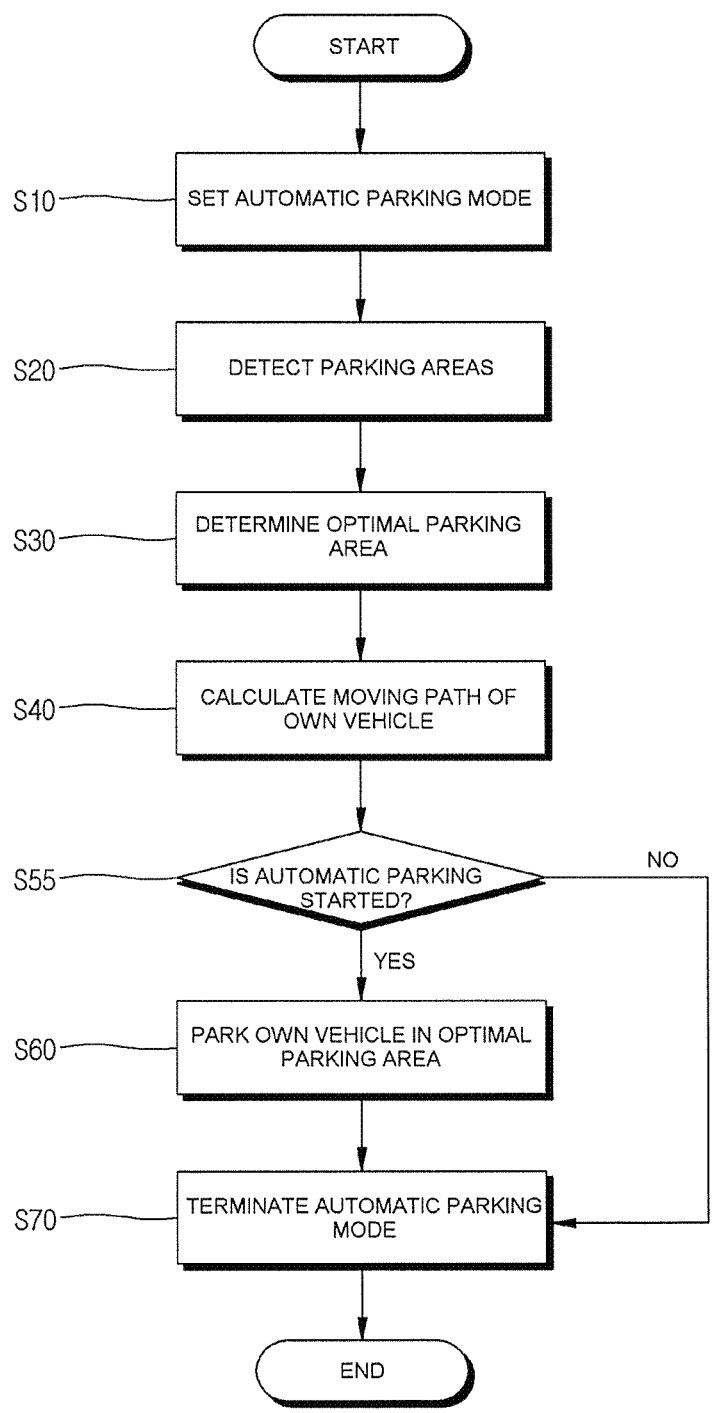

[Fig. 3]
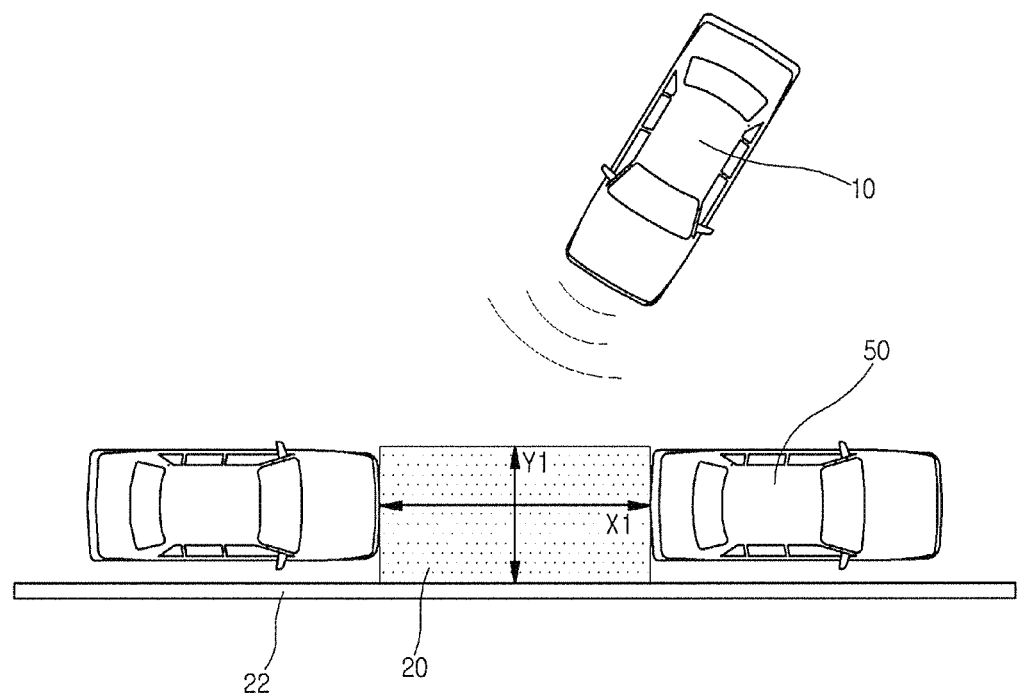

[Fig. 4]
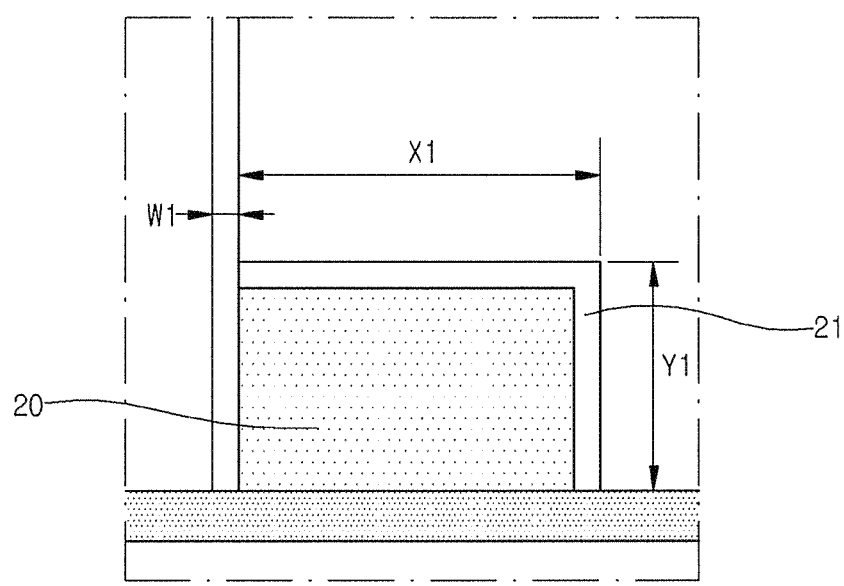

[Fig. 5]
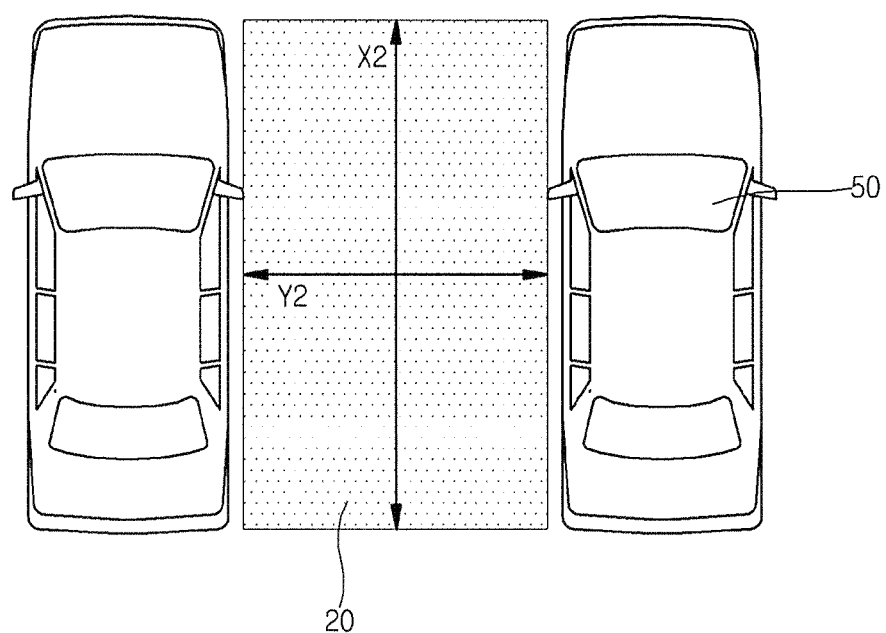

[Fig. 6]
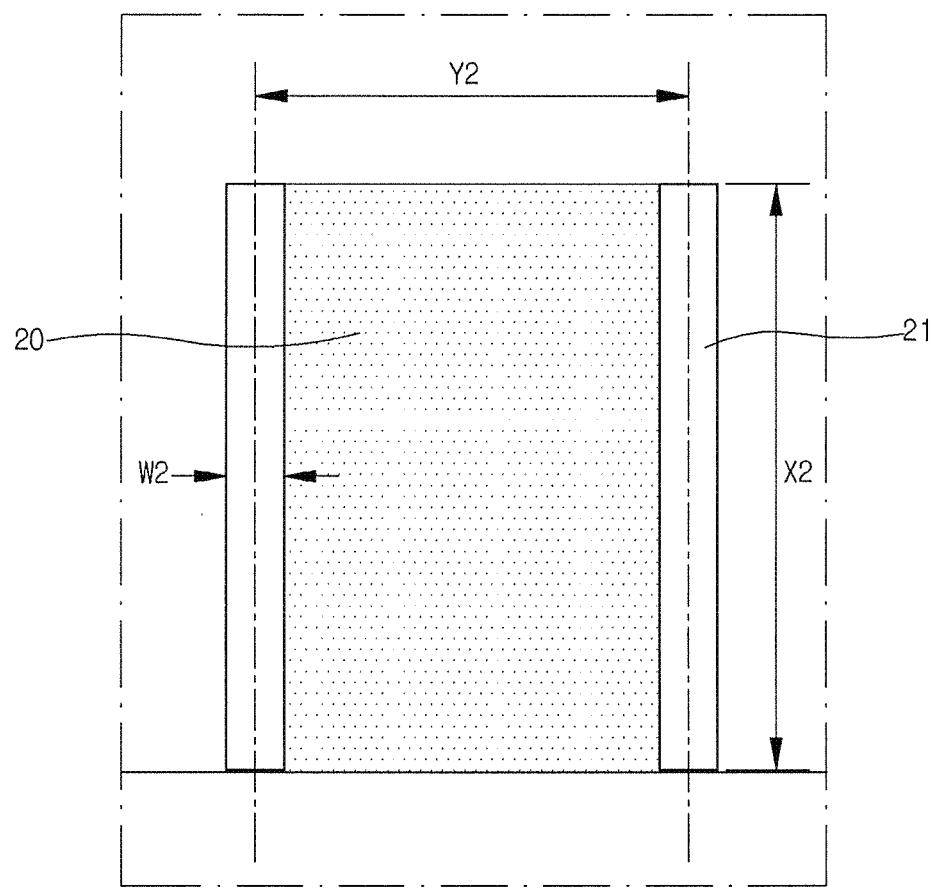

[Fig. 7]
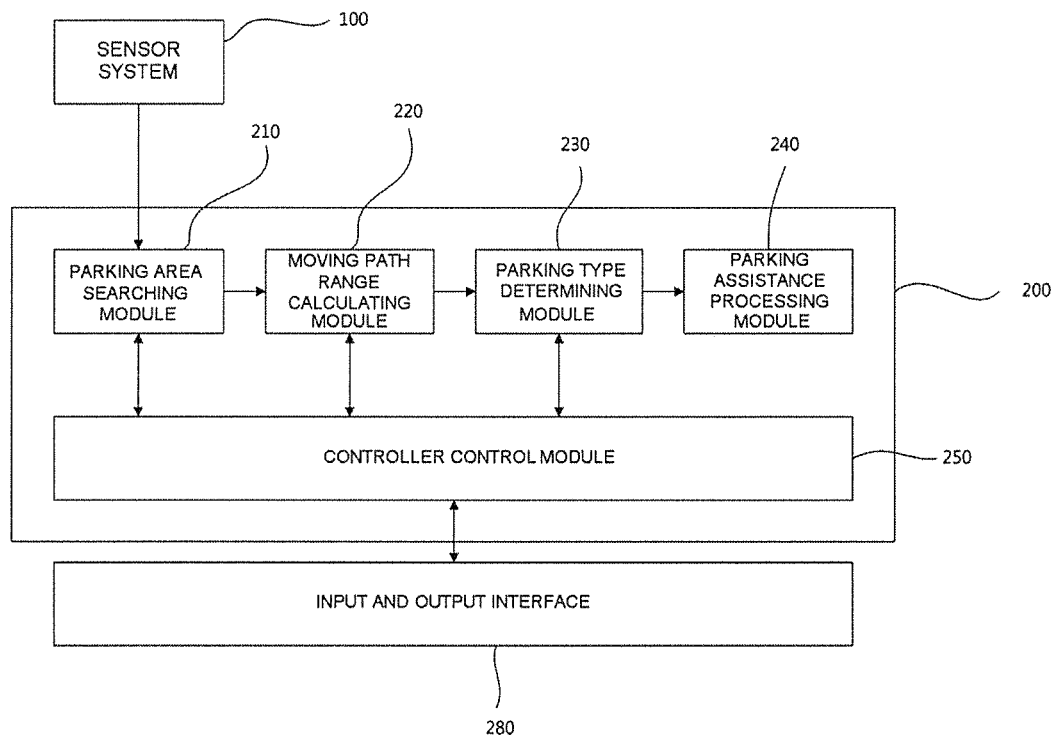
[Fig.8a]
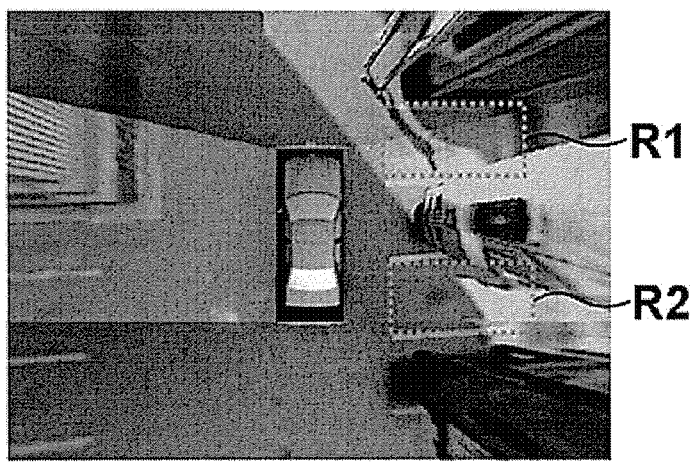

[Fig. 8b]
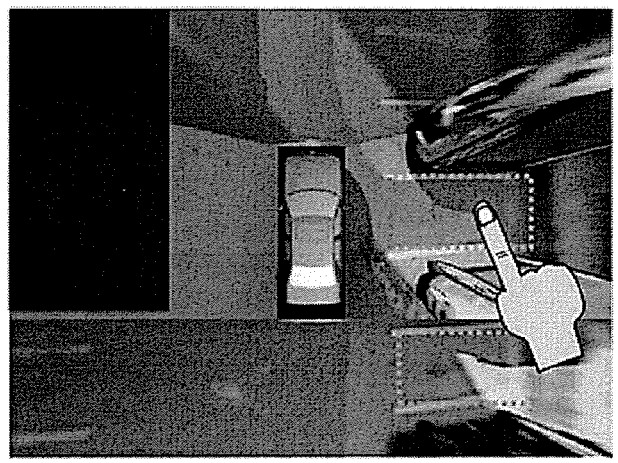
[Fig. 8c]
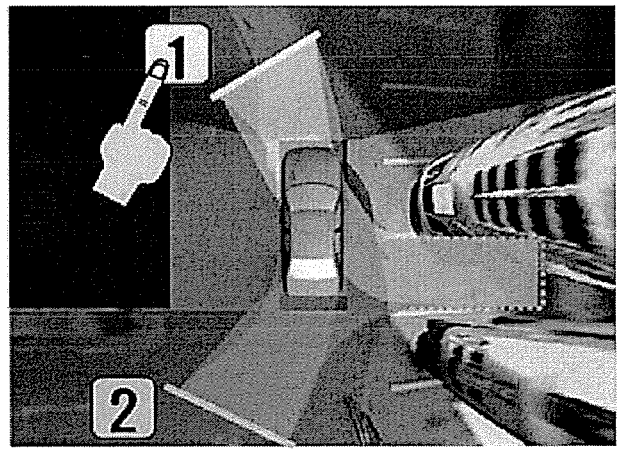

[Fig. 8d]
[Fig. 8e]
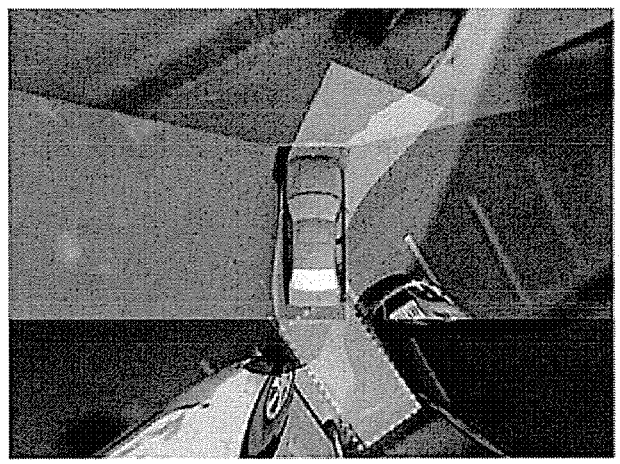

[Fig. 8f]
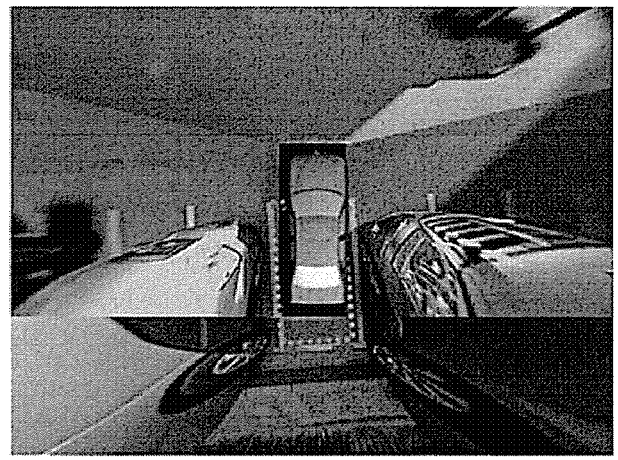
[Fig. 9a]
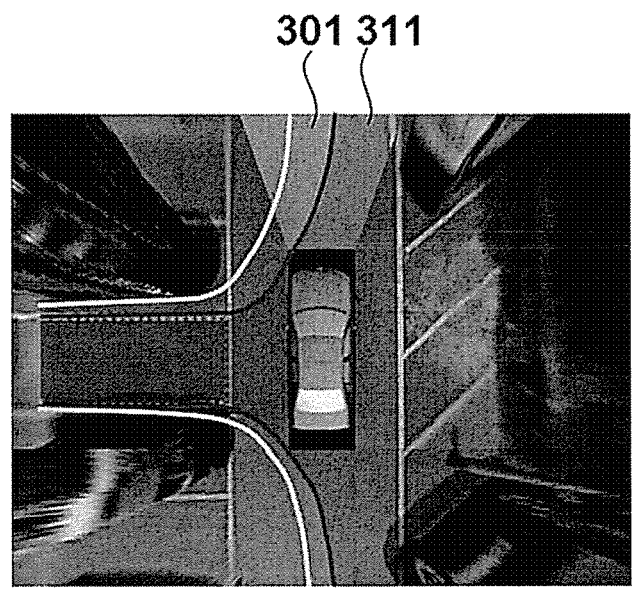

[Fig. 9b]
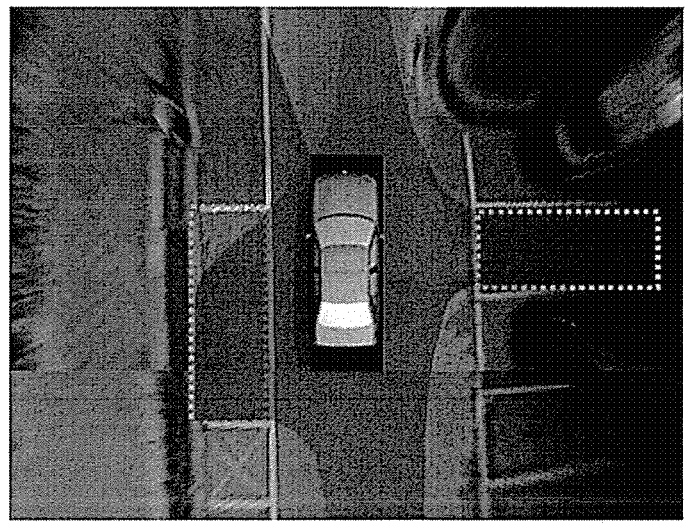
[Fig. 9c]
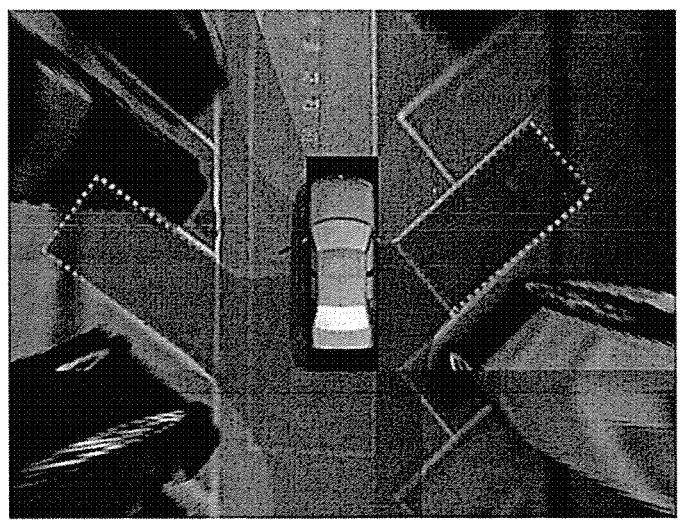

[Fig. 9d]
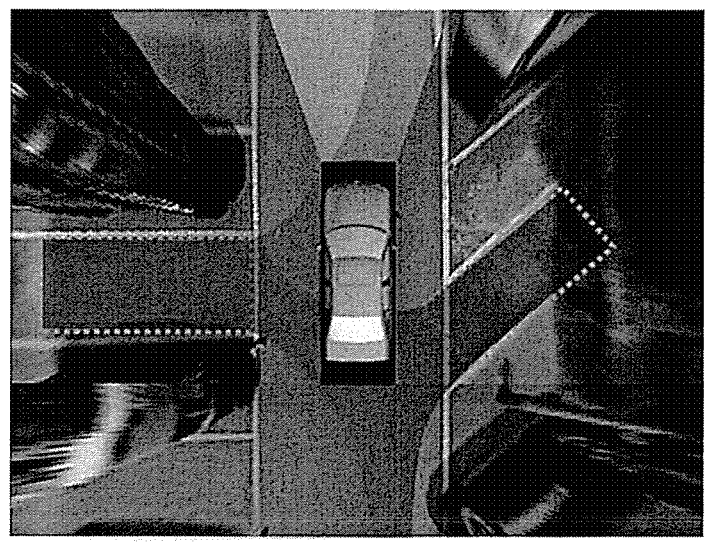
[Fig. 10]
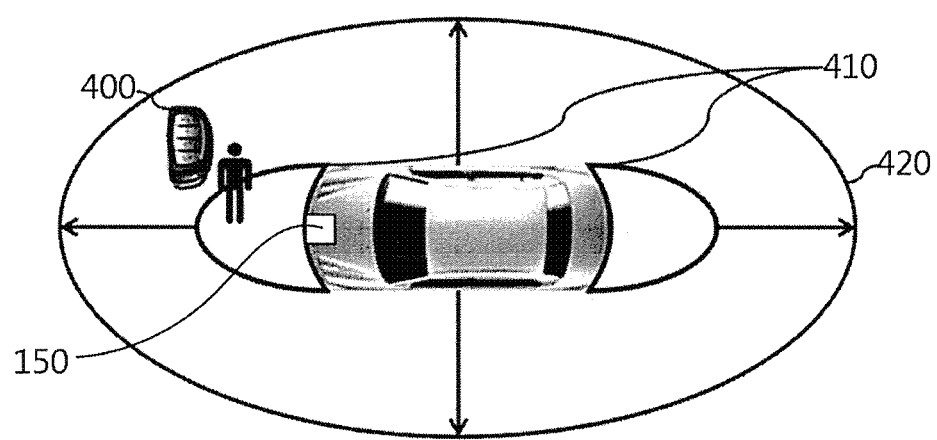

[Fig. 11]
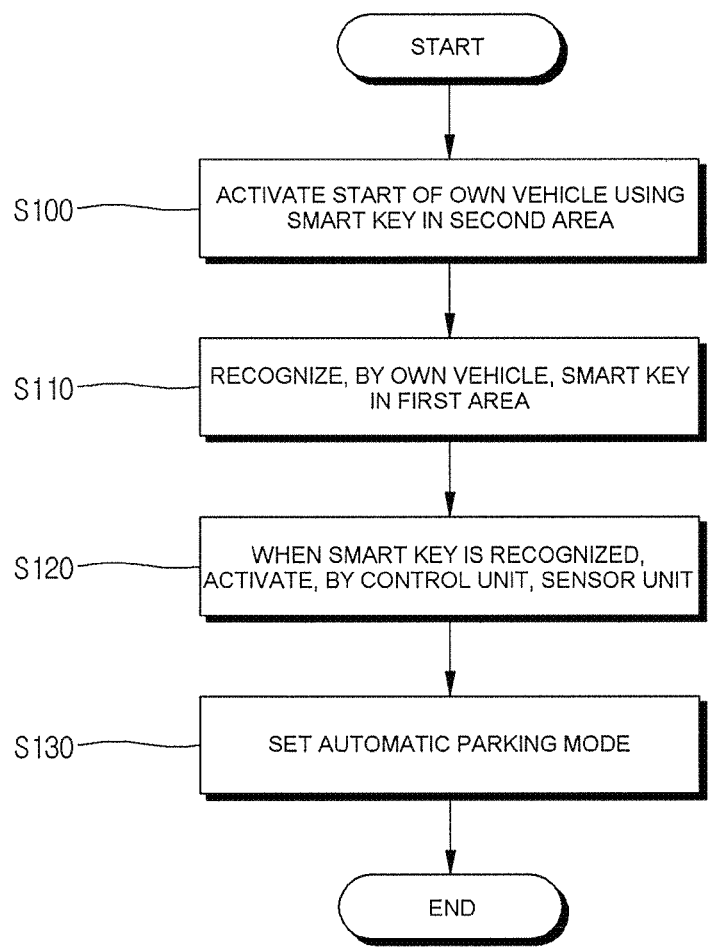

AUTOMATIC PARKING SYSTEM AND AUTOMATIC PARKING METHOD

CROSS-REFERENCE TO RELATED APPLICATION(S)

This application is a Continuation-In-Part of U.S. patent application Ser. No. 15/014,646, filed on Feb. 3, 2016, which is based on and claims priority to and the benefit of Korean Patent Application No. 10-2015-0157406, filed on Nov. 10, 2015. This application further claims priority to Korean Patent Application No. 10-2016-0184291, filed on Dec. 30, 2016. The entire disclosures of these applications are incorporated by reference herein.

TECHNICAL FIELD

Exemplary embodiments of the present disclosure relate to automatic parking, and more particularly, to an automatic parking system and an automatic parking method that use detection of a parking area.

BACKGROUND

The automatic parking system is a system capable of enabling an inexperienced driver with parking to conveniently park his/her vehicle. In the automatic parking system, when parking a vehicle, a driver determines a position of an obstacle by using a camera or an ultrasonic sensor attached to a rear portion of the vehicle, and selects parallel parking or perpendicular parking, and then the automatic parking system performs a predetermined operation.

In particular, in a case of an automatic parking system using a camera, once the driver selects a parking position while checking a rear visual field through a monitor and finally selects parking of the vehicle, the automatic parking system automatically controls a steering wheel of the vehicle using a sensor value, thereby safely parking the vehicle. Further, a parking area may be set in advance through the camera and a sensor, and the automatic parking system performs automatic parking through data obtained by the camera and the sensor. At this point, the camera may sense all of a front area, a rear area, and a side area and be implemented by around view monitoring (AVM).

SUMMARY

An object of the present disclosure is to provide an automatic parking system that may perform automatic parking by setting an optimal parking area through a sensor, and an automatic parking method.

Another object of the present disclosure is to provide an automatic parking system that obtains an image around a vehicle using a plurality of cameras installed in the vehicle, converts the obtained image to recognize an available parking area, and provides a driver with a moving path corresponding to the parking area, and an automatic parking method.

Still another object of the present disclosure is to provide an automatic parking system for remote parking of a vehicle using a smart key, and an automatic parking method.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

There is provided an automatic parking system according to an exemplary embodiment of the present disclosure. In accordance with one aspect of the present disclosure, the automatic parking system includes: a smart key recognizing sensor recognizing a smart key positioned in a first area; a sensor system sensing presence or absence of a parking section line, and positions of surrounding vehicles when the smart key is recognized; a parking area searching module analyzing data sensed by the sensor system to calculate parking areas around a subject vehicle; a moving path range calculating module calculating a range allowing generation of a moving path based on the parking areas; a parking type determining module determining at least two parking types available at a current position of the subject vehicle in the range allowing generation of a moving path and providing moving path ranges for the at least two parking types based on a moving path estimated for each parking type, a length of the subject vehicle, a width of the subject vehicle, and a rotation angle of the subject vehicle; a parking assistance processing module providing a moving path range for a parking type that is selected among the moving path ranges provided for the at least two parking types, and an optimal parking area for the selected moving path range; and a controller receiving a signal transmitted by the smart key to automatically park the subject vehicle in the optimal parking area.

The parking types may be at least two of front end parking, back-in parking, parallel parking, and diagonal parking.

The sensor system may include a first sensor sensing presence or absence of the parking section line, and positions of surrounding vehicles, and a second sensor sensing a spaced distance between the subject vehicle and the surrounding vehicles, and the moving path range calculating module may calculate a range allowing generation of a moving path based on the spaced distance when the parking section line is not recognized around the subject vehicle The smart key may perform in a second area a control of a start of the subject vehicle and a control of an automatic parking mode for executing automatic parking, and the second area may be wider than the first area.

The automatic parking mode may be released by using the smart key.

The automatic parking system may further include a display controller informing a driver of the parking areas and moving paths corresponding to the parking areas, in which the display controller transmits to the controller data on any one of the parking areas and the moving paths selected by the driver.

The display controller may include an input and output interface disposed in the subject vehicle, and the parking areas and the moving paths may be selected by touching a screen of the input and output interface.

The controller may control steering, acceleration, brake, gear shift, and parking brake of the subject vehicle.

There is provided an automatic parking method according to an exemplary embodiment of the present disclosure. In accordance with another aspect of the present disclosure, an automatic parking method for automatically parking a subject vehicle, the automatic parking method includes: activating an automatic parking mode by recognizing a smart key position in a first area; setting the automatic parking mode; sensing presence or absence of a parking section line around the subject vehicle, and positions of surrounding vehicles; analyzing the presence or absence of the parking section line and the positions of the surrounding vehicles to calculate parking areas around the subject vehicle; calculating a range allowing generation of a moving path based on the parking areas; determining at least two parking types available at a current position of the subject vehicle in the range allowing generation of a moving path and providing moving path ranges for the at least two parking types based on a moving path estimated for each parking type, a length of the subject vehicle, a width of the subject vehicle, and a rotation angle of the subject vehicle; providing a moving path range for a parking type that is selected among the moving path ranges provided for the at least two parking types, and an optimal parking area for the selected moving path range; and automatically parking the subject vehicle in the optimal parking area.

The automatic parking method may further include after the automatically parking of the subject vehicle, terminating the automatic parking mode, in which the terminating of the automatic parking mode is performed by turning off an automatic parking mode switch or shifting a gear to parking.

In the automatically parking of the subject vehicle, when an automatic parking mode switch is turned off or a gear is shifted to parking, the automatic parking mode may be terminated.

The automatic parking method may further include after the automatically parking of the subject vehicle, terminating the automatic parking mode, in which when a button of the smart key is in an on state, the subject vehicle is automatically parked, and when the button of the smart key is in an off state, the automatic parking mode is terminated.

In the automatically parking of the subject vehicle, when any one of gear shift, steering change, and brake operation is performed, the automatic parking mode may be stopped.

The automatically parking of the subject vehicle may be controlled by an input signal of the smart key.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram showing components of an automatic parking system according to an exemplary embodiment of the present disclosure;

FIG. 2 is a flowchart showing a sequence of an automatic parking method according to an exemplary embodiment of the present disclosure;

FIG. 3 is a diagram showing a parking area at the time of parallel parking according to an exemplary embodiment of the present disclosure;

FIG. 4 is a diagram showing a parking area in a case in which there is a parking line at the time of parallel parking according to an exemplary embodiment of the present disclosure;

FIG. 5 is a diagram showing a parking area at the time of perpendicular parking according to an exemplary embodiment of the present disclosure;

FIG. 6 is a diagram showing a parking area in a case in which there is a parking line at the time of perpendicular parking according to an exemplary embodiment of the present disclosure;

FIG. 7 is a diagram showing a configuration of a controller according to an exemplary embodiment of the present disclosure;

FIGS. 8A to 8F are diagrams for describing a control operation of an automatic parking system according to an exemplary embodiment of the present disclosure;

FIGS. 9A to 9D are views showing a method of calculating a moving path at the time of parking according to an exemplary embodiment of the present disclosure;

FIG. 10 is a diagram showing recognition of a smart key by a subject vehicle according to an exemplary embodiment of the present disclosure; and FIG. 11 is a flowchart showing a setting of an automatic parking mode using a smart key according to an exemplary embodiment of the present disclosure.

DETAILED DESCRIPTION

Hereinafter, embodiments of the present disclosure will be described in detail with reference to the accompanying drawings so that those skilled in the art may easily practice the present disclosure. However, the present disclosure may be implemented in various different forms and is not limited to the embodiments provided in the present description.

Portions unrelated to the description are omitted in order to obviously describe the present disclosure, and components that are the same as or similar to each other will be denoted by the same reference numerals throughout the specification.

A case in which any one part is "connected" with the other part includes a case in which the parts are "directly connected" with each other and a case in which the parts are "electrically connected" with each other with other elements interposed therebetween. In addition, unless explicitly described to the contrary, "comprising" any components will be understood to imply the inclusion of other elements rather than the exclusion of any other elements.

When it is described that any one part is "on" the other part, it may mean that the part is directly on the other part or any other part is interposed therebetween. On the contrary, when it is described that any one part is "directly on" the other part, there is no other part interposed therebetween.

Terms "first", "second", "third", and the like are used to describe various parts, components, areas, layers, and/or sections, but are not limited thereto. These terms are used only to distinguish one part, component, area, layer, or section from another part, component, area, layer, or section. Accordingly, a first part, a first component, a first area, a first layer, or a first section to be described below may indicate a second part, a second component, a second area, a second layer, or a second section without departing from the scope of the present disclosure.

Technical terms used herein are merely to describe a specific embodiment, but are not intended to limit the present disclosure. Singular forms used herein include plural forms unless context clearly indicates otherwise. A term "comprising" used in the specification specifies a specific characteristic, area, integer, step, operation, element, and/or component, but does not exclude a presence or an addition of any other characteristic, area, integer, step, operation, element, and/or component.

Terms "below", "above", and the like indicating a relative space may be used to more easily describe a relationship between one part with another part illustrated in the drawings. These terms are intended to include other meanings or operations of a device that is being used, in addition to meanings intended in the drawings. For example, when the device in the drawing is inverted, any part described as being "below" other parts may be described as being "above" the other parts. Therefore, the exemplary term "below" includes both of an upper direction and a lower direction. The device may rotate by 90° or other angles, and the terms indicating a relative space are interpreted according thereto.

Although not defined otherwise, all terms including technical terms and scientific terms used herein have the same meanings as those generally understood by a person having ordinary knowledge in the art to which the present disclosure pertains. Terms defined in a dictionary generally used are additionally interpreted as having a meaning consistent with the related art documents and contents currently disclosed, and unless defined otherwise, are not interpreted as having an ideal or very official meaning.

Hereinafter, embodiments of the present disclosure will be described in detail with reference to the accompanying drawings so as to be easily practiced by a person having ordinary knowledge in the art to which the present disclosure pertains. However, the present disclosure may be implemented in various different forms and is not limited to the embodiments provided in the present description.

FIG. 1 is a diagram showing components of an automatic parking system according to an exemplary embodiment of the present disclosure.

Referring to FIG. 1, an automatic parking system 1 may be implemented through connection among a processor level, an electrical control unit (ECU) level, and a controller level. Data sensed at the processor level may be transmitted to the ECU level, and the ECU level may control the controller level through the sensed data.

An MCU level may include a sensor system 100, which may include a camera processor 110, a Lidar processor 120, a radar processor, and a GPS processor 140.

The camera processor 110 may sense a front area, a rear area, and/or a side area of a subject vehicle, and transmit data obtained therethrough to the ECU level. The camera processor 110 may largely include an image sensor, an image processor, and a camera MCU. As an example, the image sensor may sense an image of a subject photographed through a lens, the image processor may receive the sensed data from the image sensor and process the received data, and the camera MCU may receive the processed data from the image processor. For example, the data received by the camera MCU may include data on a preceding vehicle, data on a forward lane, data on a preceding cyclist, data on a traffic sign, data on active high beam control (AHB), data on wheel detection (e.g., data for more rapidly recognizing a vehicle through vehicle wheel recognition with respect to a close cut-in vehicle that comes into a field-of-view (FOV) of a camera), data on a traffic light, data on road marking (e.g. arrow on road), data on vehicle detection (VD) at any angle (data for recognizing a vehicle with respect to all driving directions or angles of the preceding vehicle), data on road profile (e.g., data for improving riding quality through suspension control by recognizing a shape of forward road (unevenness, a speed bump, or a hole)), data on semantic free space (e.g. boundary labeling), data on a general object (neighboring vehicle, etc.), data on advanced path planning (e.g., data for predicting a vehicle driving path by deep learning through surrounding environment even on a road without lane or a contaminated road), data on odometry (e.g., data for combination with recognition information of GPS by recognizing a landmark on a driving road), data on a parking line and data on an interval between vehicles for parking, etc.

The Lidar processor 120 may be connected to a Lidar device which is a sensor, and the Lidar device may sense a front area, a rear area, and a side area of the vehicle. The Lidar device may be configured of a laser transmission module, a laser detection module, a signal collection and processing module, and a data transmission and reception module, and as a light source of a laser, laser light sources with a wavelength in a wavelength range of 250 nm to 11 μm or with variable wavelength may be used. Further, the Lidar device may be classified into a time of flight (TOP) type and a phase shift type according to a signal modulation scheme.

The radar processor 130 may be connected to a radar device which is a sensor to sense an object in the front area, the rear area, and the side area of the vehicle. The radar device may be a sensor device using an electromagnetic wave to measure a distance, a speed, or and angle of an object. When using the radar device, it is possible to sense an object within 150 m in a horizontal angle range of 30 degrees by using a scheme of a frequency modulation carrier wave (FMCW), or a pulse carrier. The radar processor 130 may process data sensed and output by the radar device, and this processing may include magnification of the sensed forward object and focusing on an area of the object in the entire view area.

The GPS processor 130 is connected to a GPS device which is a sensor to measure a current position of the vehicle. The GPS device may be a device that may measure a position and a speed of the vehicle and time by communication with a satellite. Specifically, the GPS device may measure a delay time of a radio wave emitted from the satellite, and obtain the current position based on a distance from the satellite orbit.

A smart key recognizing sensor 150 may recognize a smart key positioned within a predetermined area around the vehicle. As the vehicle recognizes the smart key, the driver may remotely control the vehicle by using the smart key from the outside of the vehicle.

A controller 200 is an electrical control unit (ECU) belonging to the ECU level, and may be a device integrally controlling multiple electronic devices used in a vehicle. For example, the controller 200 may control all of processors belonging to the processor level and controllers belonging to the controller level. The controller 200 may receive sensing data from the processors, generate a control command controlling a controller in consideration of circumstances, and transmit the control command to the controllers. In the present specification, for convenience of explanation, the ECU level is described as a higher level than the processor level, however, there may be a case in which one of the processors belonging to the processor level serves as an ECU, or a case in which two processors are combined to serve as an ECU.

The controller level may include a display controller 310, a steering controller 320, a driving controller 330, a brake controller 340, and a gear controller 350. Each of the controllers may control components of a vehicle based on the control command received from the controller 200.

The display controller 310 may be configured to provide the driver with information on a specific situation or to warn of dangerous situation. The display controller 310 may generate an audio signal, a video signal, or a haptic signal for warning of driving situation of the vehicle and dangerous situation. For example, the display controller 310 may output situation explanation and a warning sound in an audio way, and output a message about the situation or a warning message through an HUD display or a side mirror display. Alternatively, the display controller 310 may operate a vibration motor mounted in a handle to generate warning vibration.

The steering controller 320 may perform a control for a motor driving power steering (MDPS) system driving a steering wheel. For example, when collision of the vehicle is expected, the steering controller 320 may control a steering of the vehicle in a direction in which the collision may be avoided or a damage may be minimized.

The driving controller 330 may perform deceleration, acceleration, on/off of an engine to drive the vehicle. For example, the driving controller 330 may perform deceleration when collision is expected at the time of driving the vehicle, and perform on/off of the engine at the start or end of the driving of the vehicle according to the control command of the controller 200.

The brake controller 340 may control whether to operate a brake of the vehicle, and control a pedal effort of the brake. For example, when front collision is expected, the brake controller 340 may perform a control to automatically operate an emergency brake according to the control command of the controller 200 regardless of whether or not the driver operates the brake.

Meanwhile, hereinabove, the processors, the ECUs, and the controllers are described as independent components with reference to the accompanying drawings, but it is to be understood that the present disclosure is not necessarily limited thereto. Two or more processors may be integrated as one processor and may work in conjunction with each other, two or more processors and an ECU may be integrated as one device, two or more controllers may be integrated as one controller and may work in conjunction with each other, two or more controllers and an ECU may be integrated as one device.

FIG. 2 is a flowchart showing a sequence of an automatic parking method according to an exemplary embodiment of the present disclosure. The automatic parking system according to an exemplary embodiment of the present disclosure means a partially automated parking system (PAPS).

Referring to FIG. 2, the driver may set an automatic parking mode provided in the vehicle. By setting the automatic parking mode, a vehicle mode may be changed from a standby mode to an active mode in which automatic parking may be performed. A method of setting the automatic parking mode may include a first type method in which the driver executes the automatic parking mode while sitting on a driver's seat, and a second type method in which the driver executes the automatic parking mode outside the vehicle or while sitting on a seat other than the driver's seat by using a remote controller (S10). The sensor system may sense the surrounding area of the subject vehicle to calculate a plurality of parking areas in which the subject vehicle may be parked. The sensor system may sense parking lines, curbs disposed near the parking lines, an empty space between surrounding vehicles, etc. At this point, the controller 200 may calculate parking areas by considering a length and a width of the subject vehicle (S20). The controller 200 may display to the driver data on the calculated parking areas through the display controller 310. The driver may select a parking area that is determined as an optimal parking area through a display device or a separate switch in the vehicle (the first type method), or may select a parking area that is determined as an optimal parking area by using a remote controller (the second type method). At this point, the controller 200 may recommend to the driver a parking area that is determined as an optimal parking area among the parking areas (S30). When an optimal parking area is determined, the controller 200 may calculate a moving path between a current position and the optimal parking area. A detailed method for calculating the moving path will be described below (S40). The controller 200 may drive the subject vehicle based on the moving path. The controller 200 may automatically drive the subject vehicle, and control the steering controller, the driving controller, the brake controller, and the gear controller. At this point, the controller 200 may control the subject vehicle at a speed of less than 10 km/h, and control deceleration or acceleration of the vehicle, gear change, braking and parking braking, etc. The sensor system 100 may sense a distance from an obstacle during automatic parking of the subject vehicle, and the controller 200 may determine possibility of collision based on the distance between the subject vehicle and the obstacle and inform the driver of the determined possibility. The sensor system 100 may include at least one of a camera device capable of sensing a distance between the subject vehicle and an obstacle, a Lidar device, and a radar device. The driver may select whether to perform automatic parking. When the driver executes the automatic parking, the controller 200 may automatically control the subject vehicle to park the subject vehicle to an optimal parking area, and when the driver dose not execute the automatic parking, the driver may directly park the subject vehicle in the optimal parking area. If the driver turns off an execution switch of the automatic parking mode or shift the gear to parking (P) during the automatic parking, the subject vehicle may stop. At this point, the controller 200 may request the driver to select whether to maintain the automatic parking mode through the display controller. Based on an intention of the driver, the automatic parking mode may be executed again or terminated. Further, when the gear is shifted to another gear other than parking (P) during the automatic parking, and when the steering is changed to a predetermined degree or more, the vehicle may stop. For example, steering change of a predetermined degree may mean a case in which about 5 Nm of torque is applied to the steering wheel. At this point, the controller 200 may request the driver to select whether to maintain the automatic parking mode through the display controller. Based on an intention of the driver, the automatic parking mode may be executed again or terminated. Further, when the braking is performed to a predetermined degree or more during the automatic parking, the controller 200 may determine that the braking of the driver should be preferentially performed, rather than application of the automatic parking system. That is, the subject vehicle may stop by the brake (S55 and S60). In addition, the automatic parking mode may be terminated following the intention of the driver. The driver may turn off the execution switch of the automatic parking mode (the first type) or cancel the execution of the automatic parking mode by using the remote controller (the second type) (S70).

FIG. 3 is a diagram showing a parking area at the time of parallel parking according to an exemplary embodiment of the present disclosure, and FIG. 4 is a diagram showing a parking area in a case in which there is a parking line at the time of parallel parking according to an exemplary embodiment of the present disclosure.

Referring to FIGS. 3 and 4, it is possible to detect parking areas in which parallel parking may be made through the sensor system 100 attached to a subject vehicle 10. The sensor system 100 may detect a parking line 21, a curb 22 disposed around parking areas, and a space between surrounding vehicles 50, and the controller 200 may calculate parking areas by calculating whether the spaces are a space in which the subject vehicle 10 may be parked based on such information. The controller 200 may calculate an optimal parking area 20 that is most suitable for parking among parking areas. The controller 200 may select an optimal parking area 20 by considering a length and a width of the subject vehicle 10.

Referring to FIG. 4, the controller 200 may calculate the optimal parking area 20 by calculating a space between surrounding vehicles 50. The curb 22 may assist in defining a space between surrounding vehicles 50. Further, the sensor system 100 may sense an alignment line of the surrounding vehicles 50 parked in parallel to assist in calculating the optimal parking area 20. The optimal parking area 20 may have a length X1 extending in a direction in which the surrounding vehicles 50 are parked, and a width Y1 extending in a direction perpendicular to that of the length X1. The length X1 may be a value obtained by adding a length of the subject vehicle 10 and first room (+a), and the width Y1 may be a value obtained by adding a width of the subject vehicle 10 and second room (+b). For example, when the length of the subject vehicle 10 is short (4 m or less), the first room (+a) may satisfy+a=4 m×0.25 when the length of the subject vehicle 10 is ling (6 m or more), the first room (+a) may satisfy+a=6 m×0.25, and the second room (+b) may be 0.2 m. That is, the controller 200 may calculate the optimal parking area 20 by considering the length and the width of the subject vehicle 10.

Referring to FIG. 4, the sensor system 100 may sense the parking line 21, and the controller 200 may determine whether the subject vehicle 10 may be parked by calculating a length X1 and a width Y1 of the parking line 21. The parking line 21 may have a contrast range of at least 5. The parking line 21 may have a constant width W1, and the controller 200 may determine whether it is an optimal parking area 20 by considering the length X1, the width Y1, and the width W1 of the parking line 21.

FIG. 5 is a diagram showing a parking area at the time of perpendicular parking according to an exemplary embodiment of the present disclosure, and FIG. 6 is a diagram showing a parking area in a case in which there is a parking line at the time of perpendicular parking according to an exemplary embodiment of the present disclosure.

Referring to FIGS. 5 and 6, it is possible to detect parking areas in which perpendicular parking may be made through the sensor system attached to the subject vehicle. The sensor system may detect a parking line 21 and a space between surrounding vehicles 50, and the controller 200 may calculate parking areas by calculating whether the spaces are a space in which the subject vehicle may be parked based on such information.

Referring to FIG. 5, the controller 200 may calculate the optimal parking area 20 by calculating a space between surrounding vehicles 50. The optimal parking area 20 may have a width Y2 extending in a direction in which the surrounding vehicles 50 are parked, and a length 2 extending in a direction perpendicular to that of the width Y2. The length X2 may be similar to the length of the subject vehicle, and the width Y2 may correspond to a value obtained by adding the width of the subject vehicle and third room (+c). For example, the third room (+c) may be 1.2 m.

Referring to FIG. 6, the sensor system 100 may sense the parking line 21, and the controller 200 may determine whether the subject vehicle 10 may be parked by calculating a length X2 and a width Y2 of the parking line 21. The parking line 21 may have a contrast range of at least 5. The parking line 21 may have a constant width W2, and the controller 200 may determine whether it is an optimal parking area 20 by considering the length X2, the width Y2, and the width W2 of the parking line 21. For example, when the subject vehicle is a large vehicle, the length X2 may be longer than the length of the subject vehicle by 1.0 m, and the width Y2 may be longer than the width of the subject vehicle by 0.06 m. That is, the controller 200 may calculate the optimal parking area 20 by considering the length and the width of the subject vehicle 10.

FIG. 7 is a diagram showing a configuration of a controller 200 according to an exemplary embodiment of the present disclosure.

Referring to FIGS. 1 and 7, the controller 200 according to the exemplary embodiment of the present disclosure includes a parking area searching module 210, a moving path range calculating module 220, a parking type determining module 230, a parking assistance processing module 240, and a controller control module 250. An input and output interface 280 may receive a signal from the controller control module 250 to provide information to the driver. The input and output interface 280 may be a component of the display controller 310.

The controller 200 performs various functions of following modules 210, 220, 230, 240 and 250. The modules 210, 220, 230, 240 and 250 described below are implemented with software instructions executed on the controller 200.

The parking area searching module 210 may receive an image of a surrounding area of the vehicle and data on a spaced distance between the subject vehicle and the surrounding vehicles from the sensor system 100 provided in the vehicle. Here, the parking area searching module 210 may also receive an around view monitoring (AVM) image from an AVM system. Hereinafter, a case in which an input image is an AVM image will be assumed and described. The parking area searching module 210 analyzes the AVM image and the data on the spaced distance to search a plurality of parking areas around the vehicle. The parking area searching module 210 transmits a searched result of the parking areas to the moving path range calculating module 220 and the controller control module 250. The controller control module 250 may control the display controller 310 to output the searched result of the parking areas input from the parking area searching module 210 to the input and output interface 280 such as a touch screen. The input and output interface 280 may display the parking areas for the driver. The driver may select an optimal parking area among the parking areas displayed on the input and output interface 280. At this point, the number of optimal parking area may be plural. The controller control module 250 may output a control signal to the controllers to drive the subject vehicle when the optimal parking area is determined through the input and output interface 280. As an example, the parking area searching module 210 may be a component of the sensor system 100, and as another example, the parking area searching module 210 may be a component analyzing data measured by the sensor system 100.

When the control signal is input from the controller control module 250, the moving path range calculating module 220 may calculate a range allowing generation of a moving path based on an optimal parking area selected among the searched parking area information input from the parking area searching module 210 Here, once the driver selects an optimal parking area, the moving path range calculating module 220 may receive only information on the optimal parking area from the parking area searching module 210. The moving path range calculating module 220 may provide an entire range allowing generation of a moving path from the current position of the subject vehicle to the optimal parking area in the AVM image.

The moving path range calculating module 220 may recognize a parking section line (parking line) around the vehicle that is obtained through the sensor system 100, and calculate a range allowing generation of a moving path based on the recognized parking section line. If there are other vehicles around the vehicle, the moving path range calculating module 220 may calculate a range allowing generation of a moving path by considering the recognized parking section line and all other data. Meanwhile the moving path range calculating module 220 may also calculate a range allowing generation of a moving path based on other data when the parking section line around the vehicle is not recognized in the AVM image. The moving path range calculating module 220 may transmit the calculated result about the range allowing generation of a moving path to the controller control module 250 such that the calculated result is displayed through the input and output interface 280. Further, the moving path range calculating module 220 may transmit information on the calculated range allowing generation of a moving path to the parking type determining module 230.

The parking type determining module 230 may determine, based on information on a range allowing generation of a moving path that is input from the moving path range calculating module 220, a parking type available within the range allowing generation of a moving path. As an example, the parking type determining module 230 may determine a parking type available at a current position of the vehicle within a range allowing generation of a moving path, such as front end parking, back-in parking, parallel parking, diagonal parking, etc. Further, the parking type determining module 230 may estimate a moving path for each parking type available within the range allowing generation of a moving path, and calculate a moving path range based on each estimated moving path. The parking type determining module 230 may calculate a moving path range by reflecting information on a length, a width, a rotation angle, and the like of the vehicle. The parking type determining module 230 may transmit information on a moving path range for each parking type to the parking assistance processing module 240. The parking type determining module 230 may transmit information on a moving path range for each parking type to the controller control module 250 such that the transmitted information is displayed through a screen of the input and output interface 280.

The driver may confirm the moving path range for each parking type through the screen of the input and output interface 280, and select a moving path range for a desired parking type among moving path ranges for each parking type displayed on the screen of the input and output interface 280. At this point, the controller control module 250 may output a control signal to the parking assistance processing module 240 when information on a selection of the desired moving path range is input through the input and output interface 280.

Meanwhile, when the control signal is input from the controller control module 250, the parking assistance processing module 240 may output to the controller control module 250 parking assistance information according to a current position of the vehicle based on the moving path range for the parking type selected among the moving path ranges for each parking type input from the parking type determining module 230. In this case, the controller control module 250 controls the parking assistance information input from the parking assistance processing module 240 to be displayed through the screen of the input and output interface 280. The parking assistance processing module 240 may output information for inducing change of a position of the vehicle to the desired moving path range and may output information such as a stop timing and a shift timing.

FIGS. 8A to 8F are diagrams for describing a control operation of an automatic parking system according to an exemplary embodiment of the present disclosure. Specifically, FIGS. 8A to 8F show screens of the input and output interface implemented according to an operation of the automatic parking system.

Referring to FIGS. 8A to 8F, the automatic parking system uses an AVM image and a sensor measurement value to search parking areas around the subject vehicle 10. When the parking areas are searched, the automatic parking system displays parking spaces R1 and R2 searched based on a position of the subject vehicle 10 through the screen as in FIG. 8A. At this point, the driver may select an optimal parking area that is a space most suitable for parking. When the optimal parking area is selected as in FIG. 8B, the automatic parking system may calculate a range allowing generation of a moving path based on the selected target parking space and display the calculated range through the screen of the input and output interface. Thereafter, the automatic parking system calculates a moving path range for each parking type available within the range allowing generation of a moving path to display ① and ② which are moving path ranges for each parking type through the screen of the input and output interface as in FIG. 8C.

At this point, the driver may select any one moving path range according to a parking type of ① and ②. As an example, the driver may select a moving path range by touch one portion of the screen of the input and output interface.

If the moving path range of ① is selected, the automatic parking system may display parking assistance information varied according to change of the position of the subject vehicle 10 through the screen of the input and output interface screen as in FIGS. 8D to 8F, and when the subject vehicle 10 deviates from a parking trajectory range of ①, may give an alarm or allow automatic control of the steering wheel.

FIGS. 9A to 9D are views showing a method of calculating a moving path at the time of parking according to an exemplary embodiment of the present disclosure.

FIG. 9A shows an example of setting a range allowing generation of a moving path, and shows a first reference range 301 calculated by a space between surrounding vehicles measured by the sensor system 100, and a second reference range 311 calculated by a parking section line measured by the sensor system 100. As an example, the automatic parking system may set the reference range to be different depending on presence or absence of a parking section line and presence or absence of other vehicle around the subject vehicle. The first reference range 301 may be wider or narrower than the second reference range 311.

FIG. 9B shows ranges allowing generation of a moving path in a case in which a parking area in a vertical direction and a parking area in a horizontal direction based on a moving direction of the vehicle are searched. The automatic parking system may calculate each of the range allowing generation of a moving path for the parking area in the vertical direction and the range allowing generation of a moving path for the parking area in the horizontal direction.

FIG. 9C shows ranges allowing generation of a moving path in a case in which a parking area in a left diagonal direction and a parking area in a right diagonal direction based on the moving direction of the vehicle are searched. The automatic parking system may calculate each of the range allowing generation of a moving path for the parking area in the left diagonal direction and the range allowing generation of a moving path for the parking area in the right diagonal direction.

FIG. 9D shows ranges allowing generation of a moving path in a case in which a parking area in the vertical direction and a parking area in the right diagonal direction based on the moving direction of the vehicle are searched. The automatic parking system may calculate each of the range allowing generation of a moving path for the parking area in the vertical direction and the range allowing generation of a moving path for the parking area in the right diagonal direction.

As described above, when parking areas around the vehicle are searched from the AVM image, the automatic parking system may calculate ranges allowing generation of a moving path for the searched parking areas. At this point, when a target parking area is selected by a user, a range allowing generation of a moving path for the selected optimal parking area may be displayed through the screen of the input and output interface.

FIG. 10 is a diagram showing recognition of a smart key by a subject vehicle according to an exemplary embodiment of the present disclosure.

Referring to FIGS. 1 to 10, the smart key recognizing sensor 150 may recognize a smart key 400 positioned in a first area 410. The smart key recognizing sensor 150 may perform wireless communication with the smart key 400, and receive a signal from the smart key 400 to transmit the received signal to the controller 200. The controller 200 may perform vehicle door control, start control, driving control, parking control, and the like. That is, the driver may remotely control the vehicle using the smart key 400. The smart key recognizing sensor 150 may include a wireless receiver for receiving a start signal of the vehicle, and check whether a password that may included in the start signal matches to make the vehicle starts.

The smart key 400 may include a button for start, and a button for performing the automatic parking mode. The driver may control the start of the vehicle through on/off of the start button. Further, the driver may execute the automatic parking mode by operating the automatic parking mode button to be in an on state, or terminate the automatic parking mode by operating the button to be in an off state.

The first area 410 and a second area 420 may be defined according to a used frequency and purpose of the smart key recognizing sensor 150 and the smart key 400. The first area 410 may be defined as an area in which the smart key recognizing sensor 150 may recognize the smart key 400. The second area 420 may be defined as an area in which when the smart key 400 transmits a first signal, the vehicle may receive the first signal. When the driver pushes the start button of the smart key 400, the smart key 400 may transmit a start signal (first signal) to the vehicle by using ultra high frequency (UHF) of 300 to 3000 MHz.

For example, when the smart key 400 transmits a signal for activating start of the vehicle outside the 30-meter radius from the vehicle, the vehicle may not receive the signal for activating start of the vehicle. Meanwhile, if the vehicle may receive a signal transmitted by the smart key 400 within the 30-meter radius from the vehicle, the second area 420 may be defined as having a 30-meter radius.

The first area 410 may be an area in which the smart key recognizing sensor 150 installed in the vehicle may recognize a driver carrying the smart key 400. The driver may active remote parking control by pushing the automatic parking button of the smart key 400 in the first area 410, and the controller 200 needs to perform authentication for determining whether to perform parking control with respect to a person positioned in the first area 410 before activating the remote parking control. After the authentication is completed, the controller 200 then may activate the sensor system 100 and prompt the driver to set the automatic parking mode.

When the start of the vehicle is activated, the vehicle may generate a signal (second signal) for authentication periodically (e.g. 480 msec). The smart key 400 may receive the second signal, and transmit a third signal including authentication information to the vehicle in response to the second signal. The vehicle receives the third signal including the authentication information to authenticate the smart key 300 transmitting the third signal through password processing.

As an example, when the start of the vehicle is activated, the vehicle may transmit the second signal to the smart key 400 by using long frequency (LF) of 30 to 300 KHz. In this case, the first area 410 is an area in which the smart key 400 may receive the second signal. Thereafter, the smart key 400 may transmit the third signal including authentication information in response to the second signal. For example, if the vehicle transmits the second signal using 124 KHz frequency when the smart key 400 is in an area outside the 3 or 5-meter radius from the vehicle, the smart key 400 may not receive the second signal. Meanwhile, if the smart key 400 is positioned within the 3 to 5-meter radius from the vehicle, the smart key 400 may receive the second signal, and in this case, the first area 410 may be defined as having a 4-meter radius.

FIG. 11 is a flowchart showing a setting of an automatic parking mode using a smart key according to an exemplary embodiment of the present disclosure.

Referring to FIG. 11, the driver may activate a start of the vehicle through the smart key in the second area. The smart key transmits a first signal for activating the start of the vehicle to the vehicle, and the vehicle may receive the first signal to activate the start of the vehicle (S100). After activating the start of the vehicle, the smart key recognizing sensor 150 of the vehicle may sense whether the smart key is positioned within the first area. The smart key recognizing sensor 150 transmits a second signal, and the smart key that received the second signal transmits a third signal including authentication information, such that the vehicle may recognize the smart key (S110). When the smart key recognizing sensor 150 recognizes the smart key, the controller 200 may activate the sensor system. Then, the controller 200 may prompt the driver to set whether to perform the automatic parking mode (S120). The driver may perform the automatic parking mode by using the smart key outside the vehicle or on a seat other than the driver's seat (S130). Processes after setting the automatic parking mode may be the same as FIG. 2.

According to the exemplary embodiment of the present disclosure, it is possible to provide the automatic parking system capable of setting an optimal parking area among parking areas to automatically perform parking from a current position of a subject vehicle to the optimal parking area.

According to the exemplary embodiment of the present disclosure, a driver may confirm a range in which a vehicle may drive at the time of parking at a glance by providing information on a range allowing generation of a moving path based on an optimal parking area at the time of automatic vehicle parking, and a range of a moving path of each available parking type according to a length, a width, a rotation angle, and the like of the vehicle within the range allowing generation of a moving path, through the screen, thereby relieving driver's anxiety about collision with surrounding vehicles. Further, the driver may confirm information on a stop timing and a shift timing through the screen in real time at the time of parking assistance, thereby increasing convenience at the time of parking.

According to the exemplary embodiment of the present disclosure, parking may be easily performed since it is possible to park a vehicle without getting on the vehicle in the case in which the vehicle is parked in a narrow parking space using the smart key. Further, an inexperienced driver poor at parking may easily perform parking.

Meanwhile, it is to be understood that a partially automated parking system is described in the present specification by way of example for convenience of explanation. As described above, the PAPS is merely one of several advanced driving assistance system (ADAS) functions, and it is to be understood that implementation of the PAPS suggested in the present disclosure may also be used for implementation of other relevant ADAS functions. For example, the method suggested in the present disclosure may also be used to implement one function or a combination of a plurality of functions ADAS functions such as a PAPS, a land departure warning system (LDWS), a lane keeping assistance system (LKAS), a pedestrian detection and collision mitigation system (PDCMS), a forward vehicle collision warning system (FVCWS), a low speed following (LSF), a maneuvering aids for low speed operation (MALSO) and an extended range backing aid (ERBA), etc.

In one or more exemplary embodiment of the present disclosure, the described functions may be implemented by hardware, software, firmware, or a combination thereof. In a case of implementation as software, the functions may be stored in or transmitted to a computer-readable medium as one or more commands or codes. The computer-readable medium includes all communication medium and computer storage medium including any medium facilitating transmission of a computer program from one place to another place. The storage medium may be any available medium that is accessible by a computer. As a non-limitative example, the computer-readable medium may include a RAM, a ROM, an EEPROM, a CD-ROM, or other optical disc storage, a magnetic disc storage or other magnetic storage device, or any other medium that may be used to transfer or store a desired program code in a form of a command or a data structure and is accessible by a computer. Further, an arbitrary connection is appropriately referred to as a computer-readable medium. For example, when software is transmitted from a website, a server, or other remote source by using a coaxial cable, an optical fiber cable, a twisted-pair cable, a digital subscriber line (DSL), or wireless technologies such as infrared, radio, and ultra high frequency, the coaxial cable, the optical fiber cable, the twisted-pair cable, the DSL, or the wireless technologies such as infrared, radio, and ultra high frequency are included in definition of the medium. The disk and disc as used herein includes a compact disc, a laser disc, an optical disc, a digital versatile disc (DVD), a floppy disc, and a Blu-ray disc, and disks generally magnetically reproduce data, but discs optically reproduces data by laser. The above combinations also should be included in a range of the computer-readable medium.

When the exemplary embodiments are implemented by a program code or code segments, it is to be recognized that the code segment may represent a procedure, a function, a sub-program, a program, a routine, a sub-routine, a module, a software package, a class, or any combination of commands, data structures, or program instructions. The code segment may be connected to another code segment or a hardware circuit by transferring and/or receiving information, data, an argument, a parameter, or memory contents. The information, the argument, the parameter, the data, and the like may be transferred, sent, or transmitted by using any appropriate means including memory share, message transmission, token transmission, network transmission, etc. In addition, in some aspects, steps and/or operations of a method or an algorithm may reside as one of codes and/or commands or any combination or a set thereof on a machine-readable medium and/or a computer-readable medium that may be integrated as a computer program object.

In the implementation as software, technologies described herein may be implemented by modules (e.g. procedure, function, etc.) performing the functions described herein. The software codes may be stored in memory units and may be executed by processors. A memory unit may be implemented in a processor or outside the processor, and in this case, the memory unit may be connected to the processor in a manner that the memory unit may perform communication with the processor by various means as known in the art.

In implementation as hardware, processing units may be implemented by one or more of an application specific integrated chip (ASIC), a digital signal processor (DSP), a digital signal processing device (DSPD), a programmable logic device (PLD), a field programmable gate array (FPGA), a processor, a controller, a microcontroller, a microprocessor, and other electronic units designed to perform the functions described herein, or in a combination thereof.

The above description includes an example of one or more exemplary embodiments. It is apparent that those skilled in the art may recognize that every possible combinations of components or method may not be described for explanation of the above described exemplary embodiments, but additional combination and substitution of various exemplary embodiments may be possible. Therefore, the described exemplary embodiments include all alternatives, changes, and modifications within the spirit and scope of the accompanying claims. Furthermore, regarding a range in which a term "comprising" is used in the detailed description or claims, the term is included similarly to a term "be configured" as interpreted when the term "be configured" is used as a transitional word in the claims.

As used herein, a term "inferring" or "inference" generally refers to a process of determining or inferring a state of a system, an environment, and/or a user based on observation of one set captured by events and/or data. The inference may be used to identify a specific situation or operation, or may generate probability distribution with respect to, for example, states. The inference may be probabilistic, that is, may be calculation of probability distribution with respect to corresponding states based on consideration of data and events. The inference may also refer to technologies used to configure upper level events from one set of events and/or data. Such inference enables estimation of new events or operations from one set of observed events and/or stored event data, whether events are closely related in time, and whether events and data come from one or several events and data sources.

Furthermore, as used in the present application, terms "component", "module", "system", and the like include, but not limited to, hardware, firmware, a combination of hardware and software, software, or a computer-related entity such as software being executed. For example, a component may be, not limited to, a process performed on a processor, a processor, an object, executable execution thread, a program, and/or a computer. For example, both of an application driven by an operational device and the operational device may be a component. One or more components may reside in a process and/or execution thread, and a component may be concentrated on one computer, and/or dispersed between two or more computers. Further, these components may be executed from various computer-readable medium storing various data structures. Components may perform communication by a local and/or remote process such as according to a signal having one or more data packets (for example, data from any component interacting with other components of a local system and distribution system and/or other systems by a signal through a network like Internet).

What is claimed is:

1. An automatic parking system, comprising:
    a smart key recognizing sensor recognizing a smart key positioned in a first area;
    a sensor system sensing presence or absence of a parking section line, and positions of surrounding vehicles when the smart key is recognized; and
    a controller configured to:
        analyze data sensed by the sensor system to calculate parking areas around a subject vehicle;
        calculate a range allowing generation of a moving path based on the parking areas;
        determine at least two parking types available at a current position of the subject vehicle in the range allowing generation of a moving path, and provide moving path ranges respectively for the at least two parking types based on a moving path estimated for each parking type, a length of the subject vehicle, a width of the subject vehicle, and a rotation angle of the subject vehicle;
        control a display controller to control a screen to display information respectively indicating moving path ranges for the at least two parking types associated with an optimal parking area selected among the parking areas;
        provide a moving path range for a parking type that is selected among the moving path ranges provided respectively for the at least two parking types associated with the optimal parking area; and
        receive a signal transmitted by the smart key to automatically park the subject vehicle in the optimal parking area.

2. The automatic parking system of claim 1, wherein the parking types are at least two of front end parking, back-in parking, parallel parking, and diagonal parking.

3. The automatic parking system of claim 1, wherein the sensor system includes:
    a first sensor sensing presence or absence of the parking section line, and positions of surrounding vehicles; and
    a second sensor sensing a spaced distance between the subject vehicle and the surrounding vehicles, and
    the controller calculates a range allowing generation of a moving path based on the spaced distance when the parking section line is not recognized around the subject vehicle.

4. The automatic parking system of claim 1, wherein the smart key performs, in a second area, a control of a start of the subject vehicle and a control of an automatic parking mode for executing automatic parking, and the second area is wider than the first area.

5. The automatic parking system of claim 4, wherein the automatic parking mode is released by using the smart key.

6. The automatic parking system of claim 1, wherein the display controller informs a driver of the parking areas and moving paths corresponding to the parking areas,
    wherein the display controller transmits data on any one of the parking areas and the moving paths selected by the driver to the controller.

7. The automatic parking system of claim 6, wherein the display controller includes an input and output interface disposed in the subject vehicle, and the parking areas and the moving paths are selected by touching a screen of the input and output interface.

8. The automatic parking system of claim 1, wherein the controller controls steering, acceleration, brake, gear shift, and parking brake of the subject vehicle.

9. An automatic parking method for automatically parking a subject vehicle, the automatic parking method comprising steps of:
    activating and setting, by a driver of the subject vehicle, an automatic parking mode by recognizing a smart key position in a first area;
    sensing, by a sensor system, presence or absence of a parking section line around the subject vehicle, and positions of surrounding vehicles;
    analyzing, by a controller, the presence or absence of the parking section line and the positions of the surrounding vehicles to calculate parking areas around the subject vehicle;
    calculating, by the controller, a range allowing generation of a moving path based on the parking areas;
    determining at least two parking types available at a current position of the subject vehicle in the range allowing generation of a moving path and providing moving path ranges for the at least two parking types based on a moving path estimated for each parking type, a length of the subject vehicle, a width of the subject vehicle, and a rotation angle of the subject vehicle;
    displaying, on a screen, information respectively indicating moving path ranges for the at least two parking types associated with an optimal parking area selected among the parking areas;
    providing, by the controller, a moving path range for a parking type that is selected among the moving path ranges respectively provided for the at least two parking types associated with the optimal parking area; and
    automatically parking, by the controller, the subject vehicle in the optimal parking area.

10. The automatic parking method of claim 9, further comprising a step of:
    terminating the automatic parking mode, after the automatically parking of the subject vehicle,
    wherein the step of terminating the automatic parking mode is performed by turning off an automatic parking mode switch or shifting a gear to parking.

11. The automatic parking method of claim 9, wherein in the step of automatically parking the subject vehicle, when an automatic parking mode switch is turned off or a gear is shifted to parking, the automatic parking mode is terminated.

12. The automatic parking method of claim 9, further comprising a step of:
    terminating the automatic parking mode, after the step of automatically parking the subject vehicle,
    wherein when a button of the smart key is in an on state, the subject vehicle is automatically parked, and when the button of the smart key is in an off state, the automatic parking mode is terminated.

13. The automatic parking method of claim 9, wherein in the step of automatically parking the subject vehicle, when any one of gear shift, steering change, and brake operation is performed, the automatic parking mode is stopped.

14. The automatic parking method of claim 9, wherein the step of automatically parking the subject vehicle is controlled by an input signal of the smart key.

15. An automatic parking system, comprising:
a smart key recognizing sensor recognizing a smart key positioned in a first area;
a sensor system sensing presence or absence of a parking section line, and positions of surrounding vehicles when the smart key is recognized; and
a controller configured to:
analyze data sensed by the sensor system to calculate parking areas around a subject vehicle;
calculate a range allowing generation of a moving path based on the parking areas;
determine at least two parking types available at a current position of the subject vehicle in the range allowing generation of a moving path, and provide moving path ranges for the at least two parking types based on a moving path estimated for each parking type, a length of the subject vehicle, a width of the subject vehicle, and a rotation angle of the subject vehicle;
provide a moving path range for a parking type that is selected among the moving path ranges provided for the at least two parking types, and an optimal parking area for the selected moving path range; and
receive a signal transmitted by the smart key to automatically park the subject vehicle in the optimal parking area,
wherein the smart key performs, in a second area, a control of a start of the subject vehicle and a control of an automatic parking mode for executing automatic parking, and the second area is wider than the first area.

16. The automatic parking system of claim 15, wherein the automatic parking mode is released by using the smart key.

17. The automatic parking system of claim 15, further comprising a display controller informing a driver of the parking areas and moving paths corresponding to the parking areas,
wherein the display controller transmits data on any one of the parking areas and the moving paths selected by the driver to the controller.

18. The automatic parking system of claim 17, wherein the display controller includes an input and output interface disposed in the subject vehicle, and the parking areas and the moving paths are selected by touching a screen of the input and output interface.

19. The automatic parking system of claim 15, wherein the controller controls steering, acceleration, brake, gear shift, and parking brake of the subject vehicle.

20. The automatic parking system of claim 15, wherein the first area and the second area are defined at least by a communication frequency used by the smart key recognizing sensor and the smart key.

* * * * *